United States Patent
Stone et al.

(10) Patent No.: US 10,416,462 B2
(45) Date of Patent: Sep. 17, 2019

(54) SEE THROUGH DISPLAY ENABLING THE CORRECTION OF VISUAL DEFICITS

(71) Applicants: Victor Stone, Pittsburgh, PA (US); Fusao Ishii, Pittsburgh, PA (US)

(72) Inventors: Victor Stone, Pittsburgh, PA (US); Fusao Ishii, Pittsburgh, PA (US)

(73) Assignee: IRON CITY MICRO DISPLAY, Inc.

( * ) Notice: Subject to any disclaimer, the term of this patent is extended or adjusted under 35 U.S.C. 154(b) by 0 days.

(21) Appl. No.: 15/659,619

(22) Filed: Jul. 26, 2017

(65) Prior Publication Data
US 2017/0322422 A1 Nov. 9, 2017

Related U.S. Application Data

(63) Continuation-in-part of application No. 14/121,588, filed on Sep. 20, 2014, now abandoned.

(60) Provisional application No. 61/960,537, filed on Sep. 21, 2013.

(51) Int. Cl.
*G02B 27/02* (2006.01)
*G02B 27/01* (2006.01)
*F21V 8/00* (2006.01)
*G02C 11/00* (2006.01)
*G09B 21/00* (2006.01)

(52) U.S. Cl.
CPC ......... *G02B 27/027* (2013.01); *G02B 6/0035* (2013.01); *G02B 27/0172* (2013.01); *G02C 11/10* (2013.01); *G09B 21/008* (2013.01); *G02B 2027/014* (2013.01); *G02B 2027/0112* (2013.01); *G02B 2027/0118* (2013.01); *G02B 2027/0127* (2013.01); *G02B 2027/0138* (2013.01); *G02B 2027/0174* (2013.01); *G02B 2027/0178* (2013.01); *G02C 2202/10* (2013.01)

(58) Field of Classification Search
CPC ................ G02B 27/027; G02B 6/0035; G02B 27/0172; G02B 2027/0127; G02B 2027/0118; G02B 2027/0138; G02B 2027/014; G02B 2027/0112; G02B 2027/0174; G02B 2027/0178; G02B 6/00; G02B 6/34; G02B 5/188; G02B 5/32; G09B 21/008; G02C 11/10; G02C 2202/10; G03H 2001/0439; G03H 1/0408; G03H 2270/21; G03H 2210/63; G03H 2001/261
See application file for complete search history.

(56) References Cited

U.S. PATENT DOCUMENTS

| | | | | |
|---|---|---|---|---|
| 3,649,755 A | * | 3/1972 | Newman | H04N 5/58 315/10 |
| 7,755,831 B2 | * | 7/2010 | Filipovich | G02B 17/0852 250/214 LA |
| 8,152,727 B2 | * | 4/2012 | Njemanze | A61B 3/066 600/454 |
| 8,228,595 B2 | * | 7/2012 | Ishii | G09G 3/2037 359/237 |
| 9,341,850 B1 | * | 5/2016 | Cakmakci | G02B 27/0172 |

(Continued)

*Primary Examiner* — Dramos Kalapodas
(74) *Attorney, Agent, or Firm* — Bo-In Lin

(57) ABSTRACT

A See-Through Display System with the ability to correct visual deficits such as presbyopia, color blindness and poor night vision is disclosed. This invention enables the correction of visual deficits using camera(s), microdisplay (s), controlling circuit(s) with digital grayscale control and see through optics such as free form lens/mirror, half-mirror, diffractive and/or holographic optical element(s).

20 Claims, 15 Drawing Sheets

(56) References Cited

U.S. PATENT DOCUMENTS

| | | | | |
|---|---|---|---|---|
| 2001/0045982 | A1* | 11/2001 | Okisu | H04N 5/23212 |
| | | | | 348/211.99 |
| 2004/0100573 | A1* | 5/2004 | Nonaka | H04N 5/23212 |
| | | | | 348/345 |
| 2009/0059059 | A1* | 3/2009 | Fukugawa | G03B 13/36 |
| | | | | 348/347 |
| 2012/0194419 | A1* | 8/2012 | Osterhout | G02B 27/0093 |
| | | | | 345/156 |
| 2013/0077049 | A1* | 3/2013 | Bohn | G02B 5/20 |
| | | | | 351/210 |
| 2014/0104665 | A1* | 4/2014 | Popovich | G02B 27/0176 |
| | | | | 359/15 |

* cited by examiner

SEE THROUGH DISPLAY ENABLING THE CORRECTION OF VISUAL DEFICITS

CROSS REFERENCE TO RELATED APPLICATIONS

This application is a Continuation in Part application of U.S. application Ser. No. 14/121,588 filed on Sep. 21, 2014 and application Ser. No. 14/121,588 is a Non-Provisional application and claims the Priority Date of previously filed Provisional Application 61/960,537 filed on Sep. 21, 2013.

TECHNICAL FIELD

This invention relates to a wearable visual sensor-modulator-display system that (1) is worn on a user's head or face, (2) has a single or multiple visual sensors, (3) has a video image modulator, and (4) projects a video image via a microdisplay to the user's visual field. More particularly, this invention relates to the application of aforementioned display system to acquire visual imagery, modulate the video image in a manner that corrects for visual deficits and displays the visual imagery in a manner that the user can perceive and differentiate.

BACKGROUND OF THE INVENTION

Humans have various medical conditions that alter their ability to see. The so-called standard viewer is able to differentiate between multiple colors, resolve specific shapes at a standard distance, and see under specific lighting conditions. The so-called standard viewer also has the ability to maintain psychological stability despite ambient darkness. The deviation of the physiological and mental state from that of the standard viewer is considered a medical condition when the deviation obstructs daily living.

APPLICATION FOR PRESBYOPIA: As people age, they commonly lose the ability to focus on both near and far objects. This phenomenon is commonly called senior vision or presbyopia in medical language. Presbyopia happens because of the natural hardening of the lens in a viewer's eye. The hardening results in a decreased ability for the muscles to contract and expand the shape of the lens. The loss of near vision causes the most obstacles for daily life and viewers augment their vision with a low power magnification in the form of reading glasses. However, the natural progression of presbyopia is not limited to near vision, but also far vision because of the progressive hardening of the lens as described above.

FIG. 2 shows the natural physiological mechanism of focusing on an object. The eye perceives the letter 'E' (201) at some distance. To focus the object into the viewer's central vision (206), the eye muscles (203) modulate the shape of lens (204) so that the lens will focus the object 'E' onto the retina (206). The hardening of the lens causes the eye muscles to be insufficient in changing the lens form and the object cannot focus onto the retina. FIG. 3 shows the object 'E' (301-304) in focus as perceived by a young viewer, while FIG. 4 shows the object 'E' (401-404) by a view with presbyopia that is unable to focus the object onto the retina.

Viewers with presbyopia can still see clearly, but their visual focus is limited to a narrow range of distances. For the purposes of this patent, it is useful to know that such viewers can see objects clearly at a distance of 1-2 m.

Common optics can correct for this visual deficit, however conventional optics can only correct for a single focal point. For example, reading glasses often seen in drug stores an enable a viewer with presbyopia to see clearly near objects, but the same lens cannot be used for objects far away. FIG. 5 shows the usage of concave lens (501) to correct for myopia (inability to focus on far objects) and FIG. 6 shows the usage of convex lens (601) to correct for the near distances in presbyopia.

More sophisticated optics were introduced by the bifocal lens, whereby the upper half of the lens is constructed to assist viewers for far distance view (702), while the lower half of the lens is constructed to assist viewers for near distance view (703). This enables a user with presbyopia to view both near and far with a single pair of glasses. FIG. 7 shows an example of progressive lens (701) simultaneously correcting for near (703) and far (702) distances, albeit near and far distance focus is restricted to lower and upper visual fields, respectively.

However, conventional bifocal lens enables a viewer to focus on near and far by separating the lens areas. For example the lower portions of the lens cannot be used to perceive objects at a far or even normal distance. One example of this challenge is for a viewer wearing bifocal lens to descend a flight of stairs. The bifocal lens enables a view to read objects 30-45 cm, but in turn, obstructs the view from perceiving objects at a distance of 1-2 m, including the view's own feet and the next step in the stair case. This causes significant concern for views trying to descend a flight of stairs.

Another commonly mentioned challenge is a viewer with presbyopia trying to enjoy a round of golf. Bifocal lens enables a user to read a scorecard, but prohibits the viewer from focusing on a golf ball (801) when taking a shot as in FIG. 8. After taking a shot, the viewer can only see the ball in flight with the upper half of the visual field because the lower half can only focus on near objects.

Such societal needs call for a pair of glasses that is comfortable to wear, enables a wide field of view, and enables a viewer to simultaneously see objects at near and far distances in focus without restriction on upper and lower visual fields as seen in bifocal glasses.

APPLICATION FOR COLOR BLINDNESS: The eye perceives light through photoreceptor cells called Rods and Cones located in the retina of the eye (FIG. 11). Light energy elicits a cellular reaction whereby the ionic composition internal to the photoreceptor cells triggers a nerve impulse which is transmitted to the brain as a light signal. Rods (1102 and 1104) and Cones (1103) are found on an array and the selective triggering of these photoreceptors translates light images into a visual image perceived by the brain.

Color is perceived by Cones. There are three types of Cones, each with photoreceptors that enables selectivity for the three primary colors, red, green, and blue. Each red, green, and blue Cone photoreceptor has protein structures that react to light energy with wavelengths correlating to red, green, and blue light. The gene that codes for these protein structures is X-linked (found on the non-redundant arm of the X-Chromosome), and therefore males have a propensity to have genetic deficits associated with Cone photoreceptors. The sensitivity of these Cone photoreceptors is shown in FIG. 12. The first type of Cone has the sensitivity shown as the curve marked (1201) or L (long wavelength), the second type of Cone has the sensitivity of the curve marked (1202) or M (middle wavelength) and the third type of Cone has the sensitivity of the curve marked (1203) or S (short wavelength). The horizontal axis is wavelength and the vertical axis is the normalized sensitivity to each peak.

The impact of having a genetic deficit on the cone photoreceptor is the inability to differentiate that specific color. A genetic mutation located on the second type of Cone photoreceptor (whose sensitivity is the curve marked M or 1202 and hereafter called as Green Cone) will be used as it is the most prevalent. Green light may enter the eye and strike the photoreceptor layer of the retina, however, no or little of Green Cone photoreceptor reacts to the light because of the genetic deficit. Green light fails to trigger a nerve response and therefore the brain does not perceive this wavelength of light. The brain is still able to perceive red and blue light and therefore, this patient will see the world in two colors, red and blue. This is the mechanism of color blindness.

FIG. 13 shoes the population of normal vision and color blindness. The weak sensitivity of the first type of Cone photoreceptor (Red) is called as protanomaly and weaker sensitivity is called as protaopia. Similar way, the second type of Cone photoreceptor (Green) deficit is deuteranomaly and deuteraopia respectively. The third type of Cone photoreceptor (Blue) deficit is called as Tritanomaly and Tritaopia respectively. The second type Cone deficit has the largest population among color blindness and 2.7% (deuteranomaly) and 0.56% (deuteranopia). Complete color blindness (Achromatopsia) is very rare and less than 0.0001% as shown in FIG. 13. The color bars in FIG. 13 shows how each type perceive the color of spectrum.

FIG. 14 shows the patterns used for color blindness test. Normal vision sees the patterns (1401) which has red character of "6" over the background of yellow, green and blue and the pattern (1405) having green character of "74" over red and yellow background. Protanopic and Deuteranopic vison cannot discriminate red and green, therefore cannot see these characters as shown in (1402, 1403, 1406 and 1407), although Tritanopic vision can read these as shown in (1404 and 1408). FIG. 15 shows another example to show how images are perceived by each type of color blindness. The image (1501) is by Normal Vision. The image (1504) is by Protanopic Vision which loses red and a large part of green, because the sensitivity of the first type of Cone photoreceptor is overlapping from red to green. The image (1508) is by Deuteranopic Vision which loses green and a large part of red. The image (1510) is by Tritanopic Vision which loses blue.

It is important to note the mechanism of color blindness. A genetic deficit results in a change in photoreceptor protein shape, and in the majority of patients, this weakens the photochemical reaction. In other words, if the incoming light for the color in question is strengthened, a photochemical reaction can occur triggering a nerve response and the brain can perceive the color. In the above mentioned example of a green color blind patient, if a three color image were presented where the green color has significantly increased intensity, then this patient can differentiate between the three colors and perceive the world in red, green, and blue.

Such societal needs call for an apparatus that can capture the images of a patient's visual field, modulate the image by increasing the intensity of a specific color, and displaying this modified image to the patient. If images can be captured, modified, and displayed to the patient in real time, the patient can effectively enjoy daily life in three colors rather than two.

It is noteworthy to mention that such an apparatus can help patients with genetic deficits that weaken the photoreceptor reaction to a specific wavelength of light. If the genetic deficit rendered the photochemical receptor completely unreactive to the assigned wavelength, increasing the intensity will not enable correction of deficit. Fortunately, the majority of patients with color blindness have a weakness in perceiving green, and the apparatus of this invention will benefit the vast majority of color blind patients as shown in FIG. 13

APPLICATION FOR POOR NIGHT VISION: Over time, humans progressively lose night vision, or the ability to distinguish objects in darkness. The cause of this visual deficit can be multi-faceted with underlying conditions including, but not exclusive to, early cataracts, vitamin A deficiency, retinitis pigmentosa, and diabetes. Any progressive visual deficit warrants medical attention; however, not all conditions have immediately reversible treatments.

Such societal needs call for an apparatus that can capture the images of a patient's visual field in darkness, modulate the image to increase the brightness or render the image in such a way that objects can be distinguished, and display this modified image to the viewer. If such visual fields can be captured by image data, modified, and projected in real time, people can greatly enhance their ability to see in darkness.

SAFETY FEATURE FOR ALL APPLICATIONS: A safety factor that should not be missed is the importance of peripheral vision. Many people focus on the central vision or macular vision where the vision is perceived in color and the resolution is the highest. In contrast, peripheral vision has very low visual acuity and generally perceives in black and white. However, the brain receives many cues from the peripheral field which ultimately contribute to special awareness, motion detection, and depth perception. One good example is to wear a pair of goggles that restricts vision in the periphery; such views will find many activities of daily living become restricted. Therefore, it is desirable for corrective glasses to correct a wide field of view, however, ultimately leave a peripheral margin unobstructed to enable the viewer with nascent visual cues from the periphery.

Human eyes can see an image in high resolution and in color only in the central area of field of view as shown in (1605) of FIG. 16, but eyes can see very wide angle view in lower resolution and without color as wide as 180 degrees horizontally (from 1607 to 1604) and 120 degrees vertically (1606 to 1608) in FIG. 16.

In past years, preservation of the peripheral field for wearable displays was less of a concern. This is because wearable displays were either (1) completely opaque, or (2) covered only a minor aspect of the visual field. Eye-Trek by Olympus as shown in FIG. 21, and HMZ-T2 by Sony as shown in FIG. 22, are all wearable displays that are completely opaque. The peripheral vision is completely cut off by light shields and the visual field is meant to be as dark as possible except for the projected image. The designers of these products intentionally created their products in such a way to decrease the entrance of ambient light, which in turn increased the contrast ratio of the display, thus creating a better visual experience. Such products were not meant for wear during activities of daily living, but meant as personal theaters for viewers who wanted to concentrate on viewing the display. Such products do not need this safety feature because users will likely be seated and not moving about nor conducting over operations simultaneously.

On the other hand, Glass by Google as shown in FIG. 24, and MEG 4.0 by Olympus are both examples of wearable displays that cover a minor area of the visual field. The displays are meant to be worn while conducting activities of daily living, however, the majority of the visual field is unobstructed and therefore the users will have no issues in perceiving peripheral cues while using these products.

However, as wearable displays advance, it is expected that wearable displays will cover a 'full field of view,' and designed for simultaneous wear with activities of daily living. This invention seeks to be such a product whereby people with visual deficits such as presbyopia, color blindness, or poor night vision can enjoy life with a visual field that is corrected for the deficit. We expect this type of product to become useful when the display can project more than 13 degrees field of view from center and have a transparency exceeding 60%. The rationale for the field of view (13 degrees from center) is that it covers central vision (macular vision). Projection beyond that range enters into peripheral vision. 60% transparency refers to 60% of light is able to pass through the image-capture and display apparatus lens and enter into the user's eye. For a visual apparatus to be useful in daily living, the user must be able to see through the apparatus and see the visual field naturally, and we believe 60% transparency is the threshold whereby any less light would be considered obstructive for natural activities. For example, sunglasses diminish light transparency (transparency is under 60%), and although it is possible to conduct activities of daily living while wearing sun glasses, it is not considered natural. Another example is a standard pair of glasses for myopia (near sightedness). The field of view clearly exceeds 13 degrees from center and the transparency exceeds 60%. With myopia glasses, the user considers the visual field to be natural and wears them while simultaneously conducting activities of daily living.

When a user views through an image capture-display apparatus that can project more than 13 degrees from center with transparency exceeding 60%, we believe the user will require less cognitive thought. For example, when looking through 'personal theater' goggles such as Sony's HMZ-T1, the viewer clearly understands that the field of view is not natural and takes appropriate measures to prevent disorientation such as sitting down to view the image. However, if the image-capture display device is sufficiently transparent (more than 60%) and has a field of view that covers the entire central field and extends into the peripheral field (exceeds 13 degrees from center), the viewer will consider the visual field to be natural much the same way one considers the visual field when wearing myopia glasses.

When peripheral view is completely lost, the viewer loses visual cues such as motion and direction which becomes disorienting. This disorientation can result in falls or accidents while conducting activities of daily living. Ideally, an image-capture and display apparatus will capture the entire visual field and enable a user with a full field of peripheral vision. However, we believe that there is utility to maintaining a margin in the peripheral visual field that is unobstructed by the projected image because it creates a safety mechanism whereby the viewer maintains the ability to detect peripheral cues even in the event of failure by the apparatus. We believe this safety feature is critical to this invention and claim the design of an image-capture and display apparatus such that the projected image leaves an unobstructed margin of the peripheral visual field.

SUMMARY OF THE INVENTION

This invention aims to resolve this issue by fashioning a wearable display with a mounted optical sensor system that senses the user's visual field, modulates the image, and then displays that image in real time into the user's visual field. The image modulation enables image data of objects at multiple focal distances to be reconstructed into an image with objects at a focal distance that the user can perceive and differentiate. FIGS. 9 and 10 illustrate this concept. In FIG. 9, the larger rectangular frame (900) represents a hypothetical visual field. In said field, four objects are in view, two near and two far. Conventional bifocal lens restrict the focal distances of objects to the upper and lower fields, and therefore objects 1 (901) and 2 (902) can be seen, but object 3 (903) and 4 (904) are out of focus. This invention seeks to create a visual display system whereby camera inputs detect image data of the visual field and image data for individual objects are modulated and displayed to the viewer at a focal distance that the viewer can readily see.

This invention further intends to accomplish this by a data circuit loop whereby the visual field is captured by the image sensors, the video data is modulated by a processing unit to suit the user's specific needs such as presbyopia (inability to focus on near and far objects because of hardening of lens), and then this modified visual field is projected onto a display positioned in front of the user's eyes. The processor may be single or multi-part and communicate with each other through wired or wireless means. The image processing is expected to consume significant calculation resources in both power and processor and therefore, the wireless communication of the processing units enables the outsourcing of calculations to be done on a unit positioned outside the actual image capture and display apparatus.

To enable usage in daily life, the display lens of the apparatus is created in such a way that maximizes the transmission of light so that the user has a natural view of the outside field of view when the projector is not displaying an image.

This apparatus specifically incorporates a safety feature whereby the outer margin of the user's visual field is left intentionally intact without obstruction by the display lens or the display projection area. This enables the user to maintain visual cues from the peripheral vision which is useful for depth perception, motion detection in the periphery, and other spatial awareness cues that enable natural walking and activities of daily living.

The sound sensor may be single or multiple with audio capture apparatus on the surface of the apparatus, or positioned in a tube. The tube may or may not be pointed in-line with the user's visual field. The purpose of this orientation includes the optimization and differentiation of audio inputs to the user's attention. By orienting a tube in front of the audio sensor that is in-line with the user's visual field, sound inputs that coming from the front of the user will selectively be captured, thereby increasing the level of sound differentiation.

Audio data will flow from the sound sensor(s) to a sound processor system which will then transmit the audio data to the user's ears directly or through bone-conduction mechanisms.

The sound processor system may be single or multi-part and communicate with other processor components through wired or wireless means.

The presence of multiple sound sensors enables different audio signals to flow into the processor. The processor can compare the audio inputs and distinguish sound of interest while modulating ambient sound or noise. For example, consider a head-mounted apparatus with 4 total audio sensors, two positioned in forward facing tubes, and two others on the surface of the apparatus. Surface audio sensors will detect the most sound; however, the sensor cannot distinguish between ambient noise from an air conditioner and a person speaking in front of the user. The audio sensor-processor-speaker system may increase the absolute value of the audio inputs, but contrast between the ambient noise and forward speaker will not change, and the user will have difficulty discerning the words spoken in front. Audio sensors positioned within a tube pointed forward will selectively sense sound from the front. With both types of inputs, surface and tubular, the processor can compare the signals and identify what is noise and what is sound from the front. If there is a significant discrepancy, the processor can selectively amplify the forward sounds and diminish the surface sounds, thereby enabling the user to better distinguish sounds from the front from ambient noise. This invention is not restricted to this four sensor system, however, intends to capture the merits of sound spatial selectivity as described here.

PRIOR ARTS

Wearable displays received significant attention in recent years. Wearable displays, especially those with high resolution, are expected to augment or perhaps replace the smartphone as the mobile interface to the internet. Many inventors have developed wearable displays, but many are opaque; users can see the display, but cannot see through it. This will disable viewers to walk freely or to compare its projected image with the external view. This situation encouraged inventors to invent see-through displays, so that viewers can walk freely as well as comparing projected images with see-through view.

Levola in SID 2006 Digest, ISSN0006-64 • SID 06 DIGEST 0966X/06/3701-0064, Novel Diffractive Optical Components for Near to Eye Displays discloses an example of implementation of see through display, locating LCD device in the middle of two eyes, but still this does not correct for visual deficits of focal distances.

Mukawa et al. in SID 2008 Digest, ISSN/008-0966X/08/3901-0089, "A Full Color Eyewear Display using Holographic Planar Waveguides", disclose an eye glass display system that implements see-through capability with two plates of holographic optical elements. This system also has the same configuration as the above prior art and cannot correct for multiple objects at varying focal distances.

Kasai et al. disclose in U.S. Pat. No. 7,460,286 an eye glass type display system that implements see-through capability with a holographic optical element. About 85% of external light can go through lens and reaches viewer's eyes. This means that background brightness can be very high in a bright room or bright outside. Bright background washes out superimposed image and black object cannot become black, but gray or even white. This system will not be able to correct for multiple objects of varying focal distances.

U.S. Pat. No. 7,369,317, Kuo Yuin Li et. al. "Head-Mounted Display utilizing an LCOS panel with a color filter attached thereon", discloses a compact example of see-through eyeglass display using LCOS and PBS (polarized beam splitter). This invention does not include any mechanisms to correct for visual deficits in focal distance of multiple objects.

U.S. Pat. No. 7,855,743, Sako et. al. "Image Capturing and Displaying Apparatus and Image Capturing and Displaying Method", discloses an image capture and display apparatus that deals with visual deficits of focal distances including presbyopia, however, the fundamental invention and the claims relate to the adjustment of focal distance of the original image capture device. The embodiment apparatus of Sako et al., if successful, may be helpful to a viewer with presbyopia, the apparatus will ultimately (1) capture an entire visual field with a set focal distance, or (2) magnify a given field of view through telescopic means and displayed in a screen-within-a-screen format. Our claim is distinct because we seek to create a visual modulation system whereby multiple objects at different focal distances are corrected to a distance that the viewer can perceive. The spatial relationships of varying objects will be kept the same; however the visual will be projected to the viewer as if that object is at a distance where detail can be resolved. Simply put, Sako et al. do not claim an image capture-display apparatus that simultaneously corrects for multiple objects at different focal distances.

U.S. Pat. No. 854,149, Sako et. al. "Imaging Display Apparatus and Method", further extrapolate on the aforementioned U.S. Pat. No. 7,855,743 by claiming various forms of screen-within-a-screen theme. Our patent is distinct because we seek to create an image capture-display apparatus that modulates the natural field of view in such a way that object detail can be resolved by the viewer without resorting to a screen-within-a-screen format.

The above prior inventions propose inventions that enable the see-through display apparatus that can be worn on the head and enable digital image data to be displayed. Some inventions combine image sensory and display into a single apparatus. However, none of these prior arts seek to create an image sensory and display apparatus that modulates captured image data by modifying the focal distance of multiple objects and displays them for the viewer.

In recent years, there have been registered patents such as U.S. Pat. No. 7,145,571 by Jones et al., "Technique for enabling color blind persons to distinguish between various colors," which seek to create solutions that enable people with color blindness to distinguish between objects by means other than color such as hue and patterns. FIG. 13 shows an image from the aforementioned patent. Patterns are matched to colors, and image data is modified to show these patterns in lieu of colors, thereby circumventing the patient's color vision deficit and leveraging the ability to distinguish black and white vision. Our invention is fundamentally different because we seek to harness the weakened but present ability in a patient with color blindness who are not truly blind, but can sense the color if intensity is significantly increased.

Other patents still in application stage seek to create electronic apparatus that uses image captured data with data modification schemes to enable a color blind person to distinguish those objects. Once again, our invention is distinct because we seek to enhance object and color differentiation among color blind people by increasing the amount of photoreceptor reactions in the cones. The primary method to achieve this capability is not through the modulation of the video image data, but through the intensity of the light source and timing of the microdisplay.

Enhancements to night vision, or the ability to distinguish objects in darkness, has significant commercial value, as well as benefits to patients with medical conditions such as diabetes and cataracts. As seen in U.S. Pat. No. 7,755,831, Filipovich et al., demonstrate an optical system with an image intensifier that enhances vision with muted ambient light. Our invention is distinct because we utilize an image capturing device creating digital image data and projection of a modified image data by microdisplay, neither of which are primary claims by Filipovich et al.

As seen in U.S. Pat. No. 7,855,743, Sako et al. "Imaging capturing and display apparatus and image capturing and display method," suggest an image capture and display apparatus whereby users can visualize enhanced night vision as well as aid presbyopia. However, their invention makes a primary claim whereby the apparatus has sensors of the viewer's physiologic state and state of motion, which are distinct from the image sensor, and provide modulatory inputs to the controller mechanism. Our invention is fundamentally distinct because our invention has no such need; an embodiment of our invention does not include the direct communication of viewer's physiologic and motion sensors for the purpose of image modulation.

As seen in U.S. Pat. No. 8,294,766, Sako et al. "Imaging apparatus and Imaging Method," suggest an image capture and display apparatus whereby users can visualize enhanced night vision as well as aid presbyopia. However, their invention makes a primary claim whereby the apparatus has environmental sensors, which are distinct from the image sensor, and provide modulatory inputs to the controller mechanism. Our invention is fundamentally distinct because our invention has no such need; an embodiment of our invention does not include the direct communication of environmental sensors for the purpose of image modulation.

BRIEF DESCRIPTION OF THE DRAWINGS

FIG. 7 shows an example of progressive lens (701) simultaneously correcting for near (703) and far (702) distances, albeit near and far distance focus is restricted to lower and upper visual fields, respectively.

FIG. 25A shows an example of 8 bit binary PWM wherein the entire frame time is divided into 8 pulses whose pulse widths are ½ of the frame time as D0 (Most Significant Bit or MSB, 2501), ¼ of frame time as D1 (2502), ⅛ as D2, 1/16 as D3, 1/32 as D4, 1/64 as D5, 1/128 as D6 and 1/256 as D7 or Least Significant Bit (LSB, 2503).

DESCRIPTION OF PREFERRED EMBODIMENTS

This invention seeks to create such a visual sensory and display system via a visual image data flow as depicted in FIG. 17 through 20. Cameras are mounted onto a set of glasses pointed in-line with the user's visual field. The cameras convert visual images into image data, which is then sent to a modulation system where the image data is divided into specific focal distances. The modulation system may relay this information back to the camera to recapture the image through an optical focusing system, or the modulator may focus the object through digital algorithms. The modulator will ultimately output digital image data with objects with focal distances for multiple objects recalibrated to a distance that the viewer can readily perceive.

Figure 9:
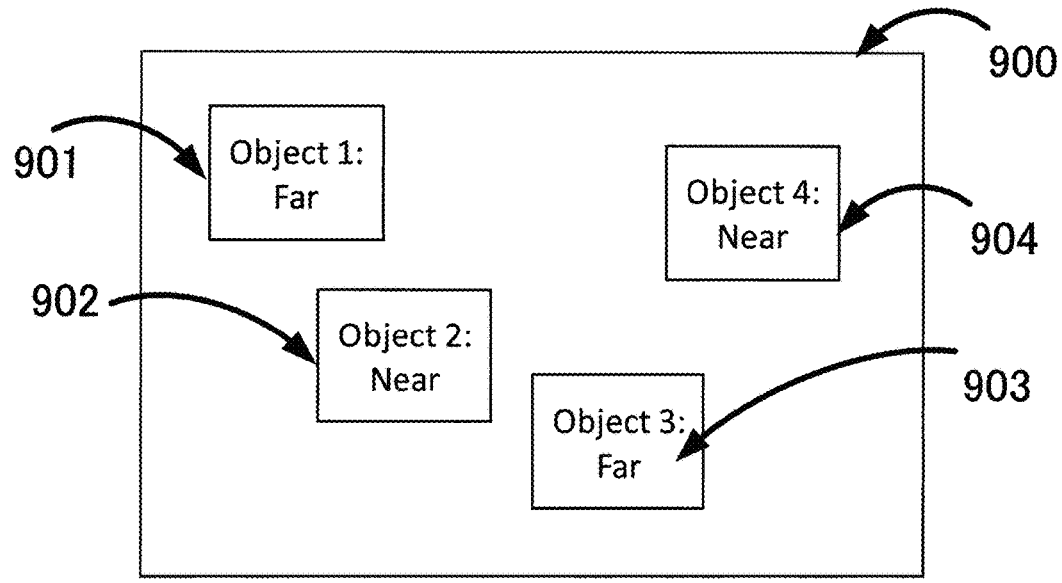
In FIG. 9, the larger rectangular frame (900) represents a hypothetical visual field. In said field, four objects are in view, two near and two far. Conventional bifocal lens restrict the focal distances of objects to the upper and lower fields, and therefore objects 1 (901) and 2 (902) can be seen, but object 3 (903) and 4 (904) are out of focus.
Figure 10:
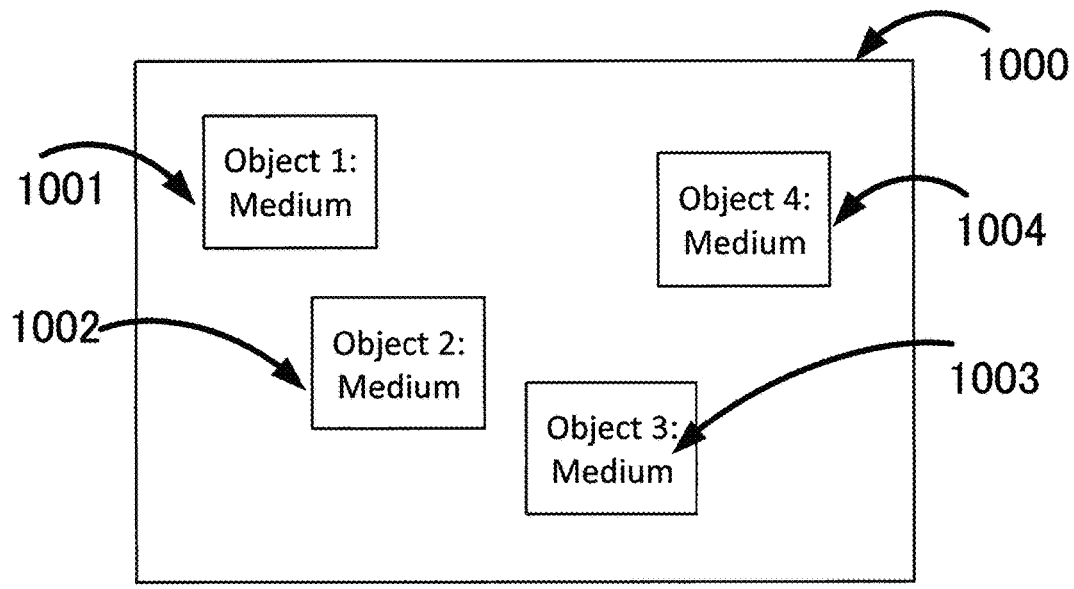
In FIG. 10, the larger rectangular frame (1000) represents a displayed field wherein all the images are captured by the camera (111 and 112) attached to the wearable display in FIG. 1 and all the captured images are individually focused and displayed in a same distance for the viewer, so that the viewer can see all images in focus.
Figure 11:
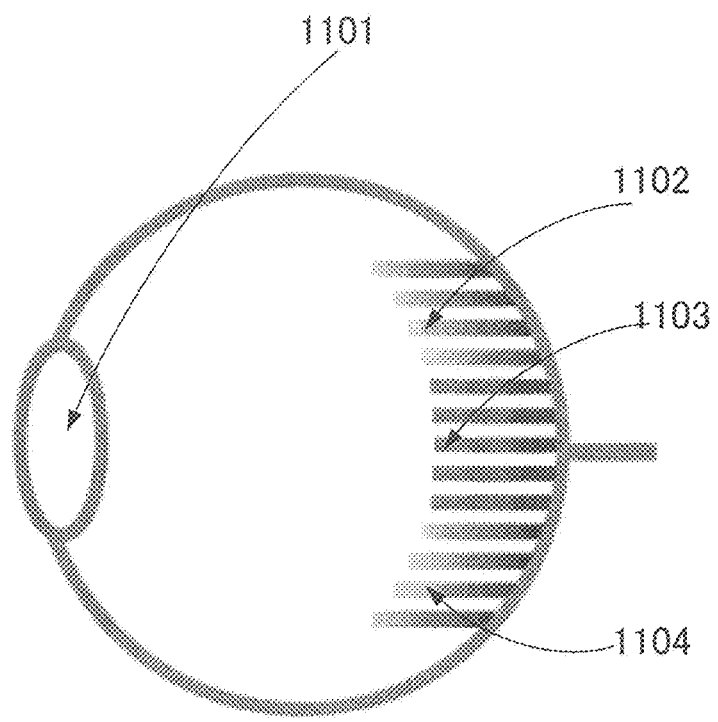
FIG. 11 illustrates the structure of human eye, wherein (1101) is a lens, (1102) and (1104) are Rods which sense brightness and (1103) is Cones which sense three colors.
Figure 11A:
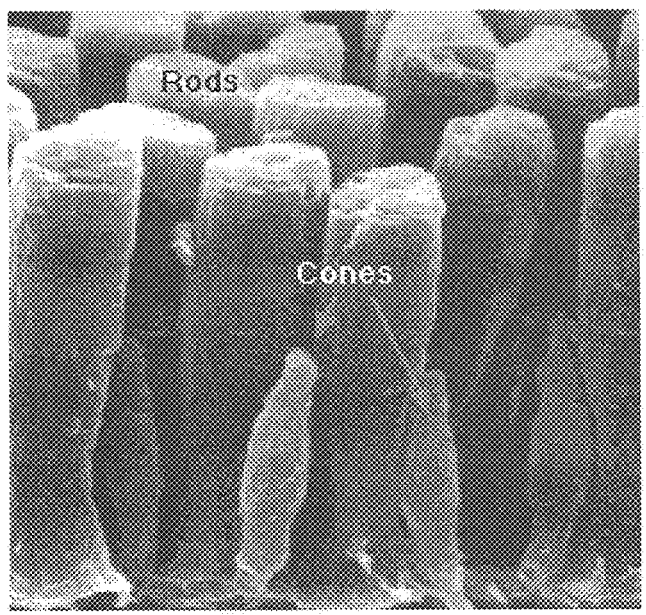
FIG. 11A shows a microscopic image of Rods and Cones. Cones have three different types. The first type of Cones is to sense long wavelength of light (red) and the second is to sense middle wavelength of light (green) and the third is to sense short wavelength of light (blue).
Figure 17:
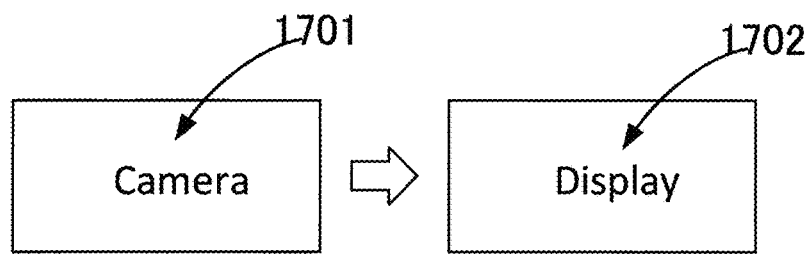
FIG. 17 shows an example of this invention with a hypothetical visual field with multiple objects with varying focal distances. The camera (1701) captures the objects (901, 902, 903 and 904 in FIG. 9) in various distances and auto-focuses at each objet and captures the focused images. The display will show all focused images (1001, 1002, 1003 and 1004 in FIG. 10) in the field of the display (1702).

FIG. 17 shows an example of the embodiments of this invention with a hypothetical visual field with multiple objects with varying focal distances. The camera (1701) captures the objects (901, 902, 903 and 904 in FIG. 9) in various distances and auto-focuses at each objet and captures the focused images. The display will show all focused images (1001, 1002, 1003 and 1004 in FIG. 10) in the field of the display (1702).

Figure 18:
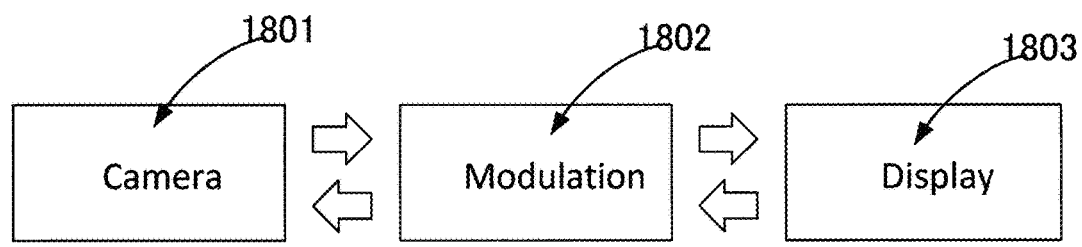
FIG. 18 illustrates an example of this invention wherein the video signal is modulated to enhance video image to a viewer 1) who needs the images of individually focused objects regardless of distances and with adjusted size and brightness of image (presbyopia, myopia or hyperopia) or 2) who needs strengthened color to correct color blindness or 3) who needs visualized images in a darkness (night-vision). (1801) is a visual sensory such as a camera with CMOS image sensor and 1802 is a processor to modulate the images from the camera to provide a viewer of the above 1) and/or 3) with modulated image signals of individually focused objects regardless of distances and with adjusted size and brightness of images and to provide a viewer of the above 2) with strengthened color to correct color blindness. The display system (1803) shows said modulated images to the viewer.

FIG. 18 illustrates an example of the embodiments of this invention wherein the video signal is modulated to enhance video image to a viewer 1) who needs the images of individually focused objects regardless of distances and with adjusted size and brightness of image (presbyopia, myopia or hyperopia) or 2) who needs strengthened color to correct color blindness or 3) who needs visualized images in a darkness (night-vision). (1801) is a visual sensory such as a camera with CMOS image sensor and (1802) is a processor to modulate the images from the camera to provide a viewer of the above 1) and/or 3) with modulated image signals of individually focused objects regardless of distances and with adjusted size and brightness of images and to provide a viewer of the above 2) with strengthened color to correct color blindness. The display system (1803) shows said modulated images to the viewer.

Figure 19:
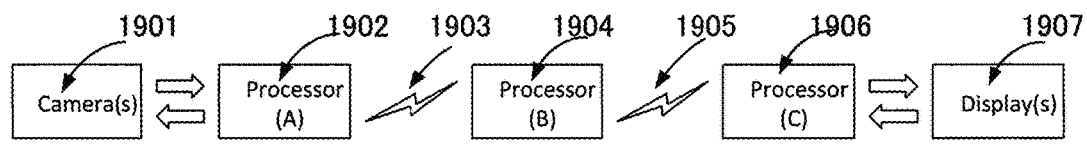
FIG. 19 illustrates an example of this invention wherein the video signal from the camera (1901) to the processor (A) (1902) is analyzed for focus and brightness and feedback to the camera (1901) so that the images of individually focused objects are captured with adjusted brightness. The processor (A) (1902) transmits the data of the images to the Processor (B) (1904) of an external unit such as a cellphone which has a more powerful processor than that of the wearable display through wireless transmission (1903) such as electromagnetic wave or modulated light. Often video data processing requires high computation and consumes more energy which the battery of wearable display cannot support. The external processor (B) (1904) processes the data and return to another processor (C) (1906) in the wearable display and the Processor (C) will transfer data to the display (1907) in the wearable display through wireless transmission (1905).

This invention seeks to create the aforementioned visual sensory and display system in the shape of common glasses (lens(s), nose piece, and ear brace(s)) that is light weight and comfortable to wear. To accomplish this, it may become necessary to divide the modulation component depicted in FIG. 18 into three sections, Processor (A), (B), and (C) as depicted in FIG. 19. The purpose of this division is to allow for superior computing power in Processor (B) to be made external to the glasses, while the camera(s) and display(s) are still fitted into the glasses.

FIG. 19 illustrates an example of the embodiments of this invention wherein the video signal from the camera (1901) to the processor (A) (1902) is analyzed for focus and brightness and feedback to the camera (1901) so that the images of individually focused objects are captured with adjusted brightness. The processor (A) (1902) transmits the data of the images to the Processor (B) (1904) of an external unit such as a cellphone which has a more powerful processor than that of the wearable display. Often video data processing requires high computation and consumes more energy which the battery of wearable display cannot support. The external processor (B) (1904) processes the data and return to another processor (C) (1906) in the wearable display and the Processor (C) will transfer data to the display (1907) in the wearable display. The data transmissions between Processor (A) and Processor (B) (1903) and between Processor (B) and Processor (C) (1905) are from a group of wireless, wired and fiber optic.

Figure 20:
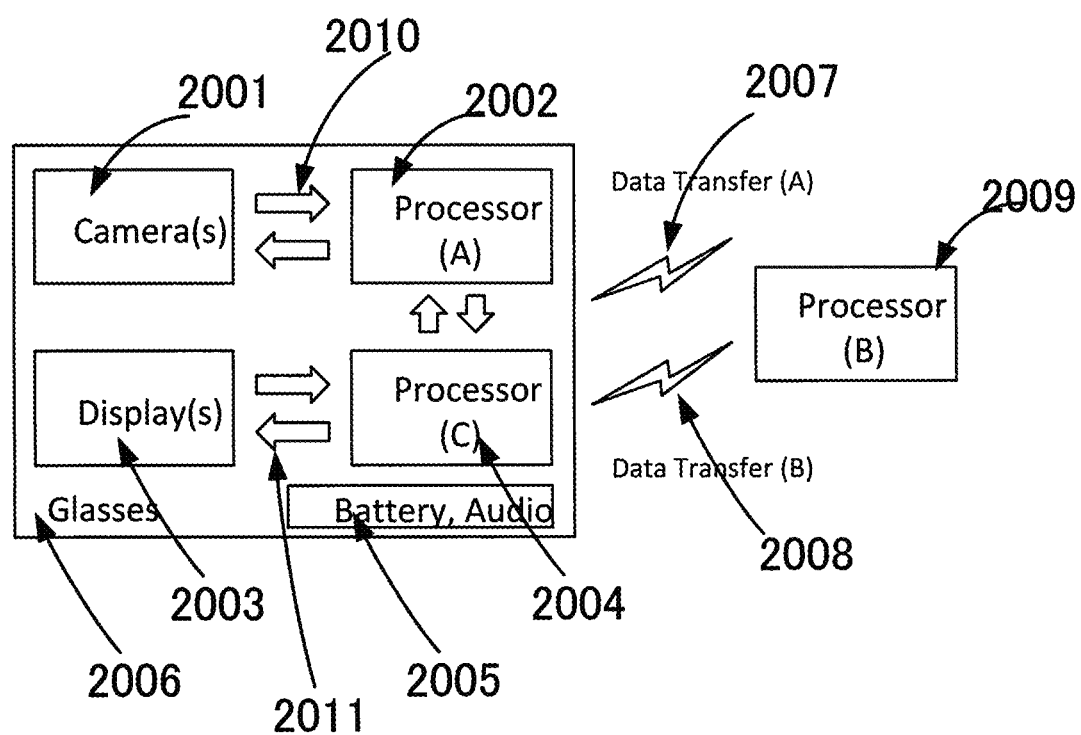
FIG. 20 illustrates an example of this invention wherein some or all of the chips on a wearable display are packed in a single SOC (system on chip) or single scale package or single die package.
Figure 21:
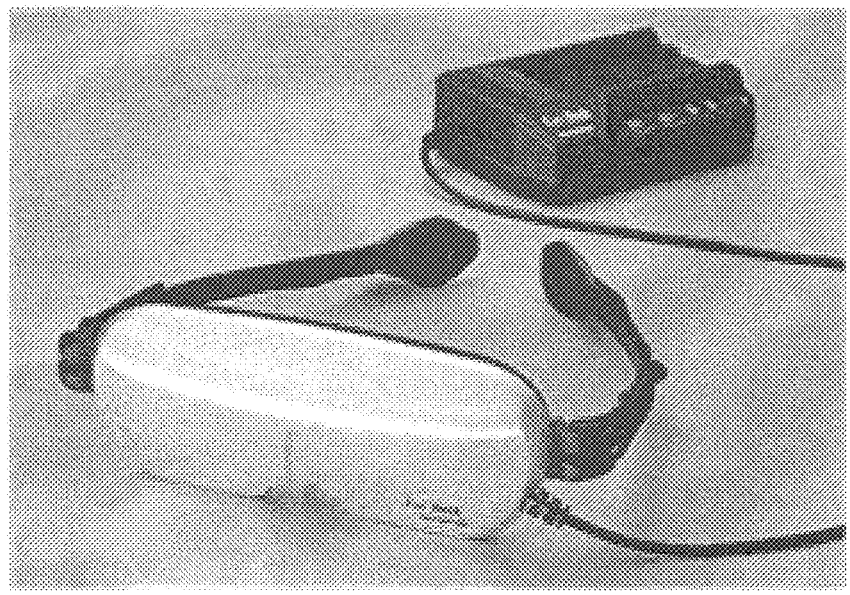
FIG. 21 shows an example of a face mount display made by Olympus, "Eye-Trek". This completely obstructs view from the viewer.
Figure 22:
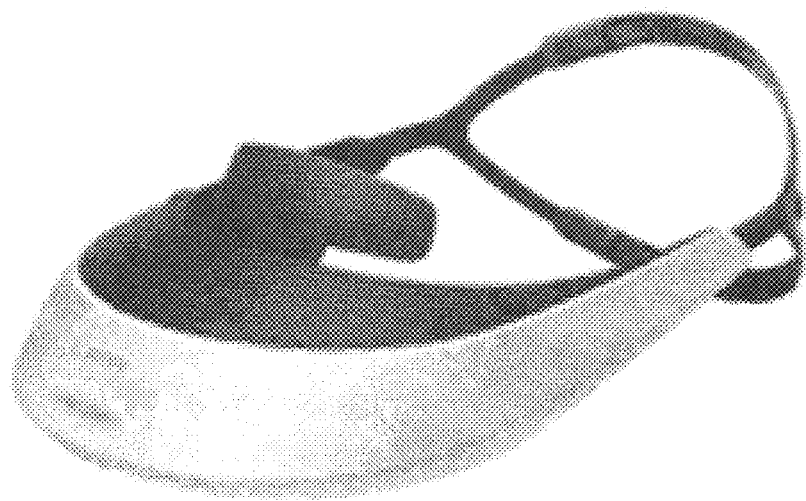
FIG. 22 shows a head mount display, HMZ-T2 by Sony which is a wearable display that is completely opaque.
Figure 23:
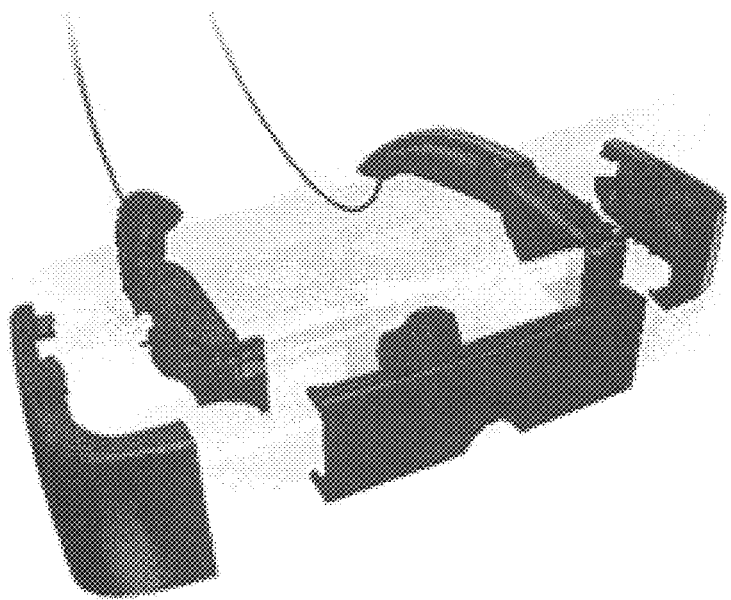
FIG. 23 shows an example of wearable display with see-through optics with half mirrors. The light transmission is less than 50% and the image becomes dark.
Figure 24:
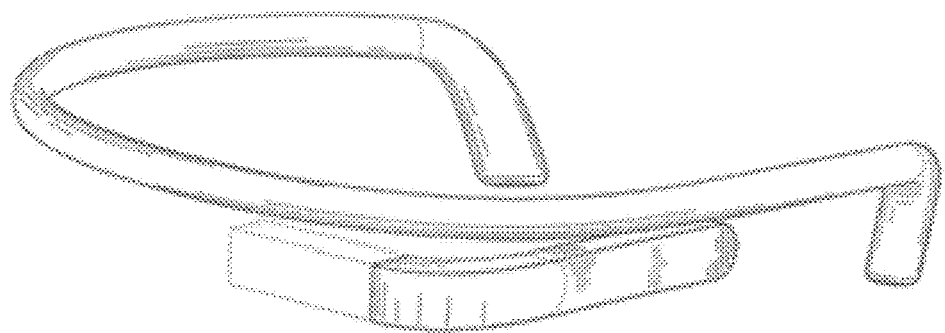
FIG. 24 shows an example of wearable glasses with display and camera. Glass by Google as shown in FIG. 24, and MEG 4.0 by Olympus are both examples of wearable displays that cover a minor area of the visual field. The displays are meant to be worn while conducting activities of daily living, however, the majority of the visual field is unobstructed and therefore the users will have no issues in perceiving peripheral cues while using these products.
Figure 25A:
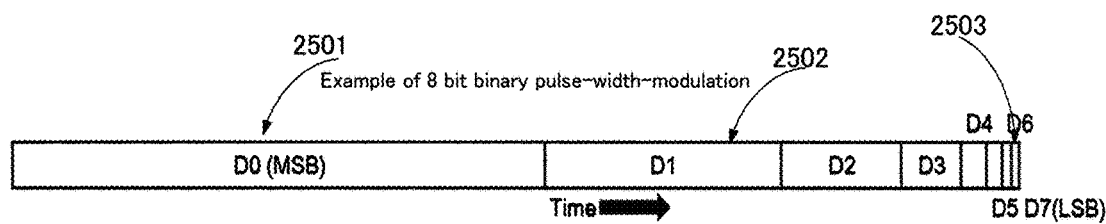
FIG. 25A shows an example of digital Pulse-Width-Modulation (PWM) of brightness. Analog brightness control used to be popular for analog display devices such as CRT and LCD. Analog brightness control uses analog control of driving voltage or current of display devices to control brightness. However precise control of brightness is difficult with analog control and digital brightness control provides more accurate in other words higher grayscale brightness control is possible. Instead of changing the duty ratio of pulse width, binary PWM shown as in FIG. 25A is becoming more popular, because digital video signal can be directly used as ON pulse with "1" and OFF pulse with "0".
Figure 25B:
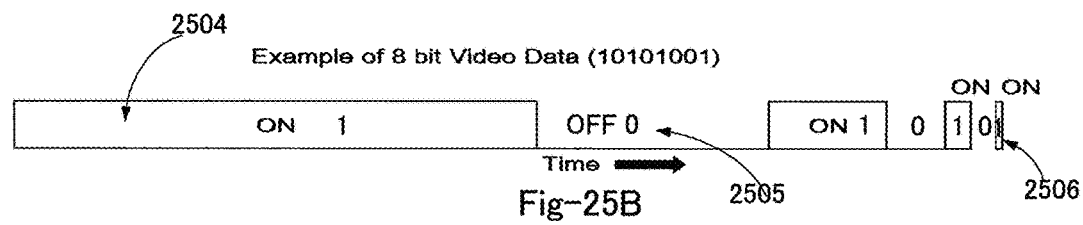
FIG. 25B shows an example of 8 bit binary PWM with the data of 10101001 in binary which is 169 in decimal and it represents the brightness of 169/256=66% of peak brightness. The first 1 means D0 or MSB (2504) and ½ of the frame time must be ON or peak brightness. The "0" at D1 (2505) means the next ¼ of frame time must be OFF meaning zero brightness. This process continues to D7 (Lease Significant Bit or LSB, 2506). Thus any brightness with integer multiplication of LSB (=1/256) from 0 to 1 can be shown with 8 bit binary PWM. However Sequential order from MSB to LSB requires very high band width of signal transfer lines.
Figure 25C:
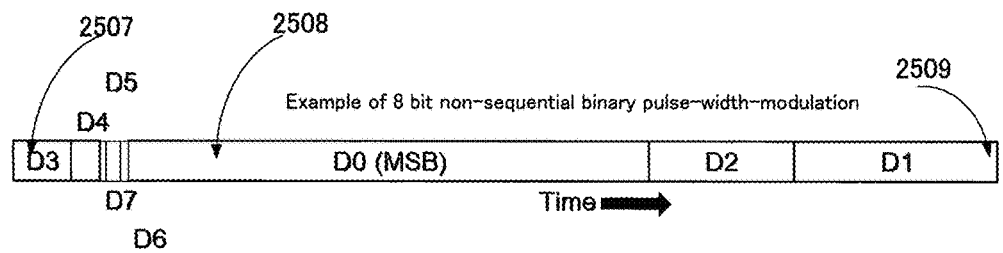
FIG. 25C shows an example of non-sequential order of data transfer which reduces the band width requirement of signal transfer. The details of non-sequential data transfer are described in U.S. Pat. No. 8,228,595, Ishii et. al.

FIG. 20 illustrates an example of embodiment of this invention wherein some or all of the chips on a wearable display are packed in a single SOC (system on chip) or single scale package or single die package.

Another example of the embodiments of this invention is that Processor (B) (1904 in FIG. 19 or 2009 in FIG. 20) is connect to the internet to allow for internet data to be displayed on the glasses.

Another example of the embodiments of this invention is that Processor (A) (2002) and Processor (C) (2004 in FIG. 20) communicate directly.

Another example of the embodiments of this invention is that the communications between processors ((A) and (B), (B) and (C), and (A) and (C)) in FIG. 19 and FIG. 20 are unidirectional or bidirectional.

Another example of the embodiments of this invention is that the image capture and display apparatus are battery powered, or receive power from an external source via wired or wireless power transfer.

Another example of the embodiments of this invention is that the image capture and display apparatus have a single or multiple audio input(s) and output(s) to allow for user instructions to Processor (A), (B), and (C) in FIG. 19 or FIG. 20, and also for transfer of information from the Processor (A), (B), and (C) to the user.

Another example of the embodiments of this invention is that the image capture and display apparatus has a safety feature which comprises of a design that allows a margin outside the projected visual field if the projected visual field exceeds 13 degrees from center with a front-of-eye lens apparatus with more than 60% transparency.

Figure 1:
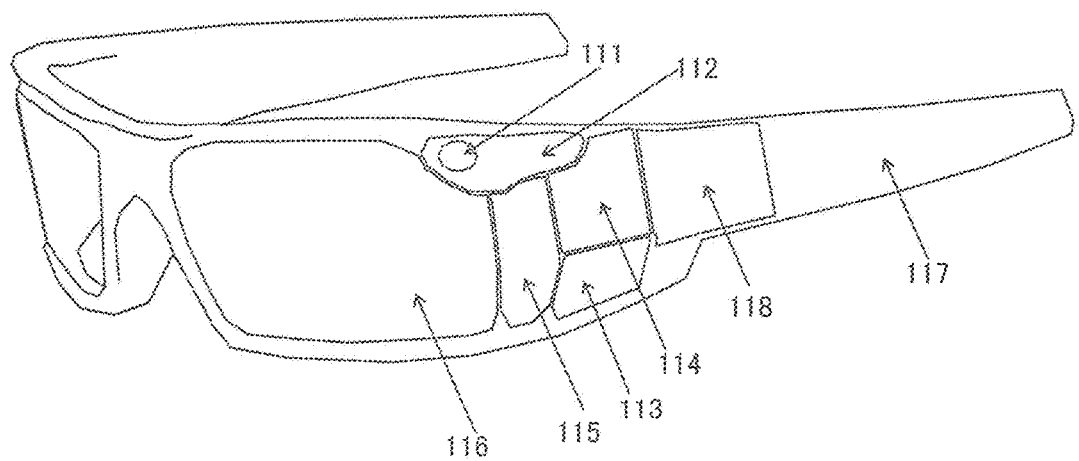
FIG. 1 shows an example of this invention. (116) is a transparent plate functioning as a wave guide having a hologram layer to enable see-through display. (111) is a camera lens and (112) is a CMOS image sensor module. (115) is a mirror to reflect projected light into the wave guide (116). (118) is a light source, (114) is a projection lens, (113) is a controller electronics and (117) is an eye-glass frame containing a battery.
Figure 2:
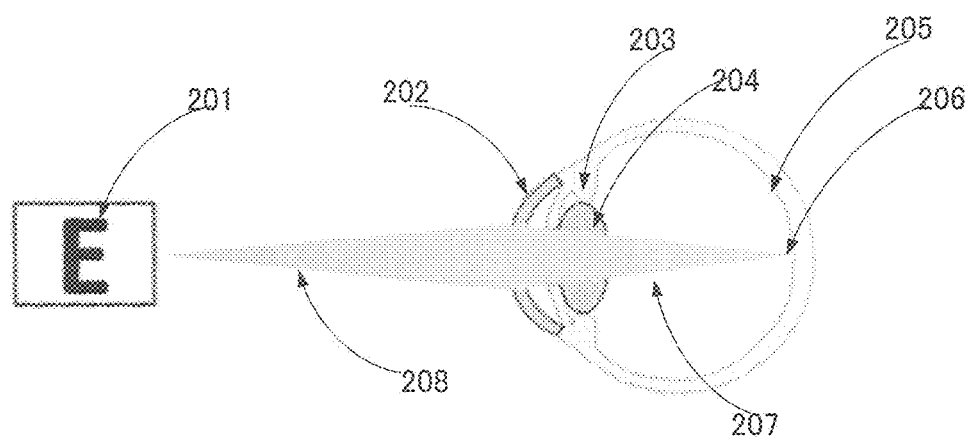
FIG. 2 illustrates that the object (201) is projected to the retina (205). Light 208 is projected from the object (201) and is led to cornea (202) and lens (204). The ciliary muscle (203) adjusts the lens (204) to focus the light beam (207) onto the retina (205) and fovea (206).
Figure 3:
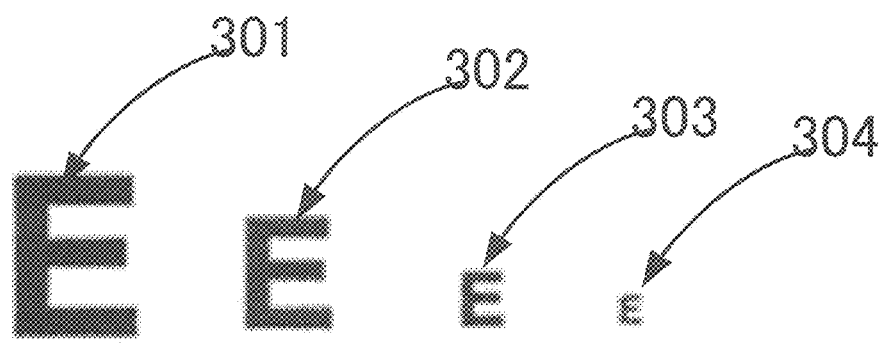
FIG. 3 shows how a viewer with normal vision sees the images. The large characters 301, 302, 303) can be seen and the small character (304) becomes difficult to read.
Figure 4:
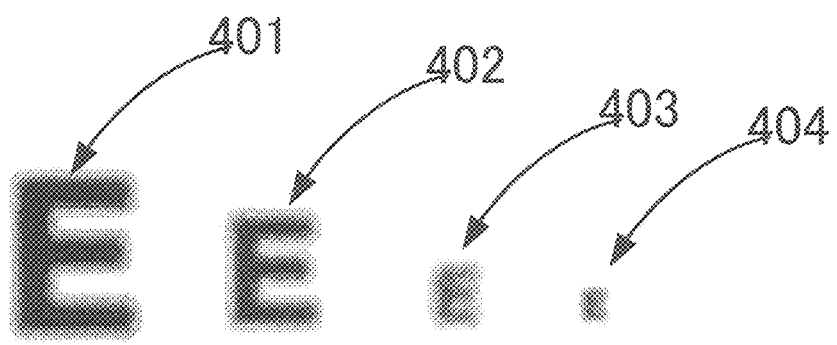
FIG. 4 shows how a viewer with presbyopia sees the images. Even the large character (401) is not focused on the retina.

An example of the embodiments of this invention is shown in FIG. 1. Optical element such as lens with holographic optical element (HOE) or diffractive optical element (DOE) is shown at (116). A camera is shown at (111). A Free-Form Prism/Mirror is shown at (115). A microdisplay is shown at (114) and a light source is shown at (118). A set of batteries is shown at (117). A controller circuitry is shown at (113).

Figure 12:
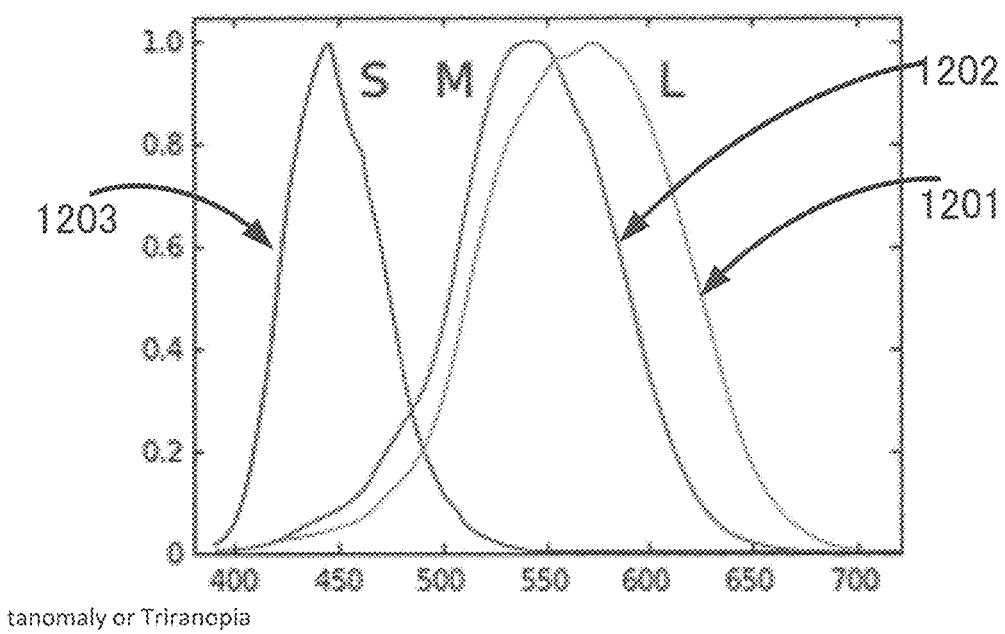
FIG. 12 shows the sensitivity curves (1201, 1202 and 1203) of each type of Cones to the wavelength of light. For example, the first type of Cones absorbs the light energy with the sensitivity curve of L (1201) having wavelength between about 500 nm and 650 nm with its peak at 560 nm and converts its photon energy to chemical energy and transfer to brain through the nerve system. The second type of Cones absorbs light energy with the sensitivity curve of M (1202) and converts photon energy around 530 nm (green). The third type of Cones does the same with the curve of S (1203, blue). This means that the function of the first type of Cones is to sense primarily red light and the second is green and the third is blue. If the first type of Cones is unable to function, the viewer will have color blindness of red or Protanomaly or Protanopia depending of the extent. If the second type of Cones has deficit, it will cause color blindness of green or Deuteranomaly or Deuteranopia depending on the extent. The third type is color blindness of blue or Tritanomaly or Tritanopia.
Figure 13:
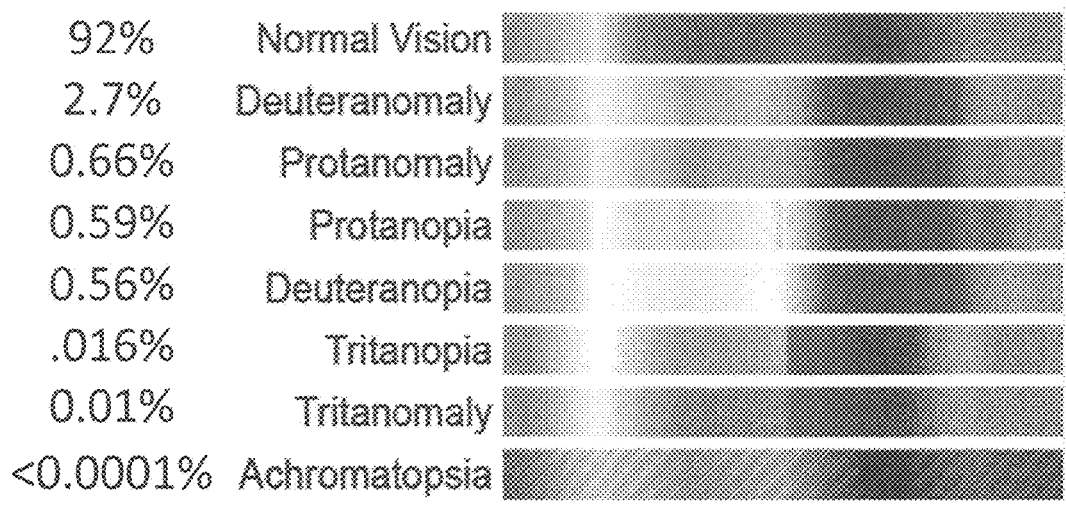
FIG. 13 shows the population of color blindness. 92% of people are normal. The largest number of color blind patients is Deuteranomaly (2.7%) and Deuteranopia (0.59%), then Protanomaly (0.66%) and Protanopia (0.59%), Tritanopia (0.016%) and Tritanomaly (0.01%) follow. The color bars show how patients in each category will see the colors. Complete color blindness is less than 0.0001%. The majority of color blindness can be corrected by enhanced vision system except complete color blindness.
Figure 14:
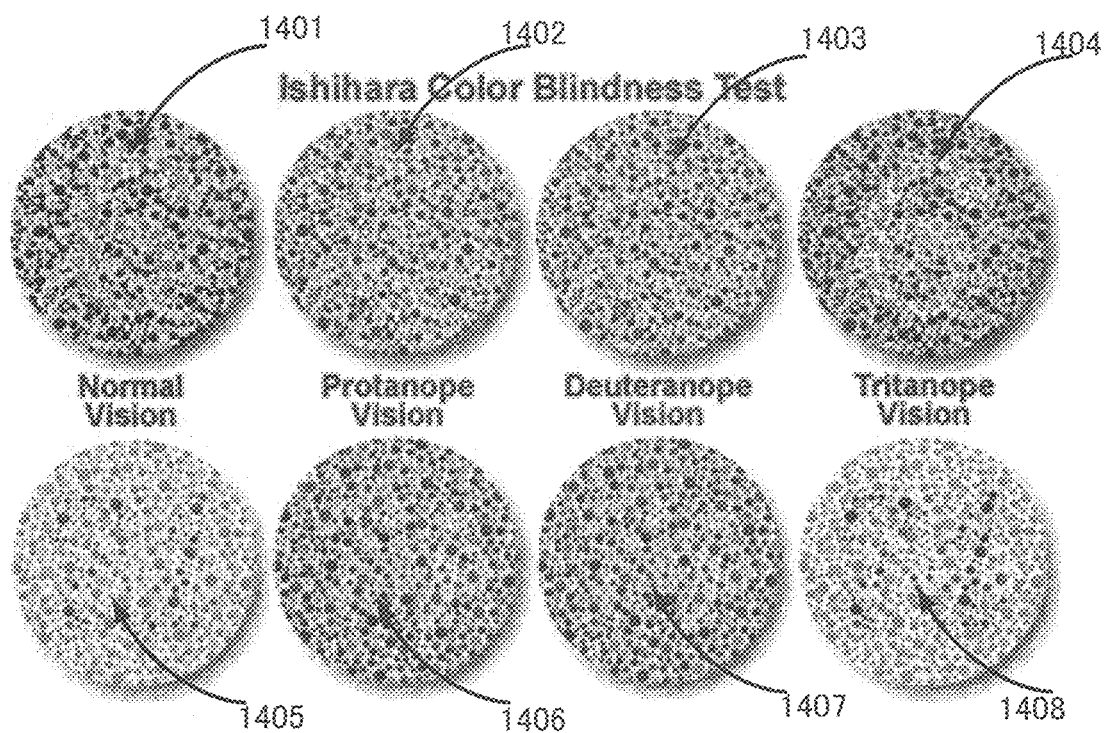
FIG. 14 shows the patterns used for color blindness test. Normal vision sees the patterns (1401) which has red character of "6" over the background of yellow, green and blue and the pattern (1405) having green character of "74" over red and yellow background. Protanopic and Deuteranopic vison cannot discriminate red and green, therefore cannot see these characters as shown in (1402, 1403, 1406 and 1407), although Tritanopic vision can read these as shown in (1404 and 1408).
Figure 15:
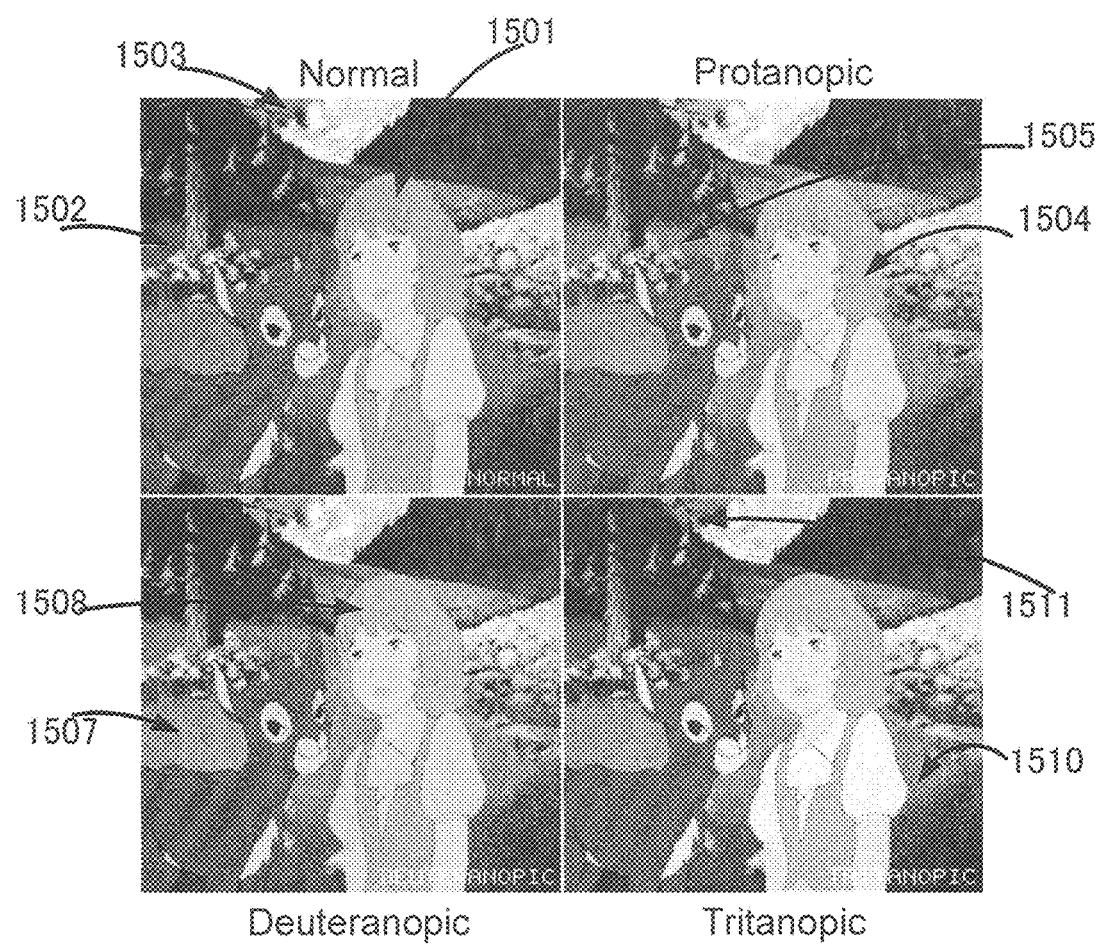
FIG. 15 shows another example to show how images are perceived by each type of color blindness. The image (1501) is by Normal Vision. The image (1504) is by Protanopic Vision which loses red and a large part of green, because the sensitivity of the first type of Cone photoreceptor is overlapping from red to green. The image (1508) is by Deuteranopic Vision which loses green and a large part of red. The image (1510) is by Tritanopic Vision which loses blue.
Figure 16:
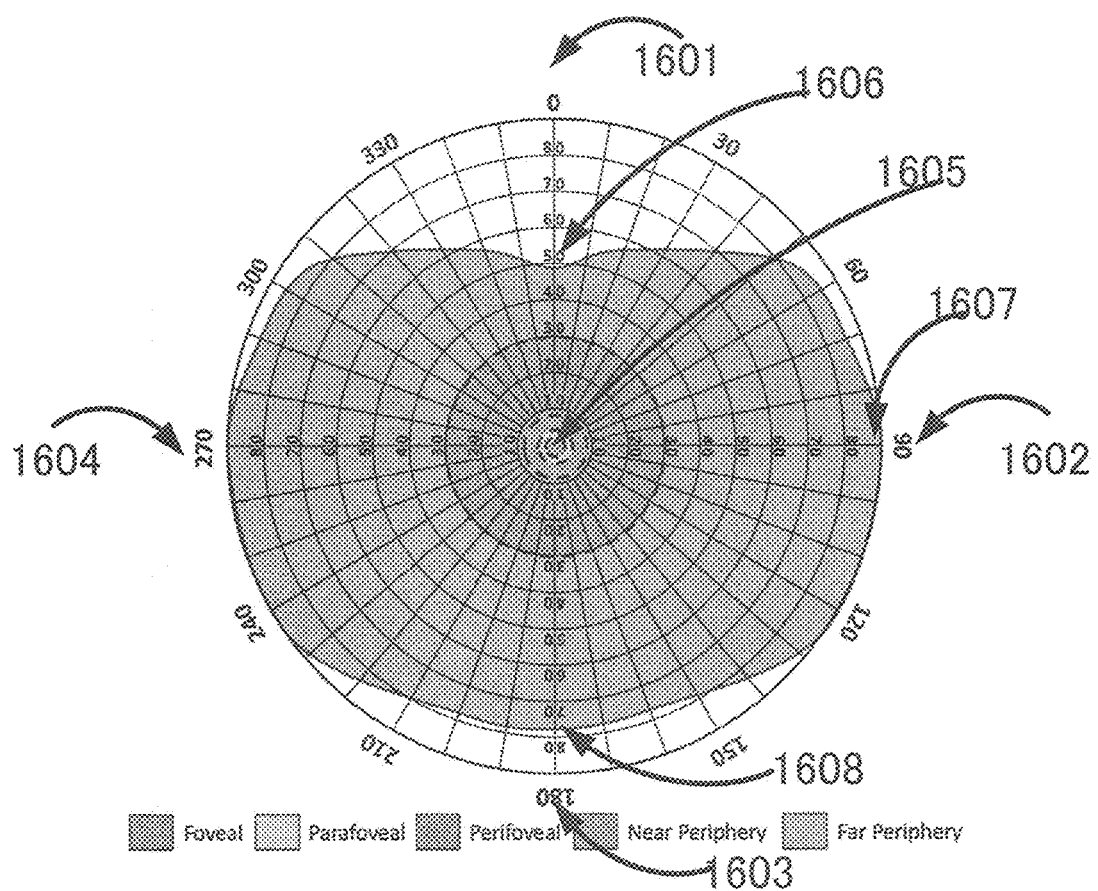
FIG. 16 shows the Field of View (or FOV) of human eyes. Human eyes can see an image in high resolution and in color only in the central area of field of view as shown in the green area (1605), but eyes can see very wide angle view in lower resolution and without color as show in the blue area which is as wide as 180 degrees horizontally from +90° (1607) to −90° (1604) and 120 degrees vertically from +50° (1606) to −70° (1608).

Color blindness is defined as the ability to differentiate discrete areas of the visual field varying wavelengths of light: approximately 564-580 nm, approximately 534-545 nm, and approximately and 420-440 nm. These ranges are approximate as shown in FIG. 12; physiologic sensitivities of cone cells have a distribution that exceeds these wavelengths. FIG. 14 illustrates an example of a test apparatus for color blindness. Ishihara Color Blindness Test is an internationally accepted form of testing color blindness and the standard viewer is able to score 100% while any deviation is considered a form of color blindness. The apparatus shall modulate the cumulative amount and mixture of light emitted from the display to increase or maximize (100% is maximum) the score on the Ishihara Color Blindness test, or increase the ability to differentiate colors in the three ranges of wavelength described here (approximately 564-580 nm, approximately 534-545 nm, and approximately and 420-440 nm). The algorithm to modulate the displayed image shall vary the total light emission from the display and the mixture of colors (wavelength of light) emitted.

Visual Acuity is defined as the ability to differentiate objects at a distance.

$$\text{Acuity}=1/(\text{gap size [arc min]})$$

The standard viewer has a visual acuity of 1.0, and therefore is able to differentiate objects at 1 arc min (1/60 of degree). Visual acuity less than 1.0 is considered a deficiency in visual acuity. A comparison of 304 and 404 demonstrates a loss of visual acuity whereby in 304, the horizontal lines of the letter E can be differentiated while in 404 the lines cannot. To provide a conceptual description: given a situation whereby the standard viewer perceives 304, and an individual with deficiency in visual acuity as described above perceives 404, the apparatus shall enable the individual with deficiency in visual acuity to perceive 304. For a more formal definition, the apparatus shall enable a viewer to increase visual acuity as described as 1/(gap size [arc min]).

The algorithm to modulate the image shown on the apparatus shall combine two elements: (1) magnification of an object in question and (2) increase in contrast. Magnification is defined as an increase in the horizontal and vertical visual arc required by the object in question. Contrast (K) is difference in luminescence of bright (Lh) and dark (Ll) visual regions defined as:

$$K=(Lh-Ll)/Lh \text{ with } 0=<K=<1.$$

K=0 means there is no contrast while Kmax=1.

The apparatus shall provide an option to invert black and white of a field of view. Although the mathematical differences in contrast remain unchanged with the inversion of dark and light areas of the visual field, the eye is trained to detect small areas of light in a background of dark far better than a small area of dark in a background of light.

The apparatus shall increase visual acuity (defined as 1/gap size [arc min]) in an individual with a deficiency in visual acuity (defined as visual acuity less than 1.0) by an algorithm using at least one of (1) increasing the magnification of the object in question (defined as an increase in the horizontal and vertical arc lengths of an object in the visual field) and (2) increasing the contrast (K defined as (Lh−Ll)/Lh). The apparatus shall provide an option to invert light and dark (black and white) areas depending on the preference of the user.

Figure 5:
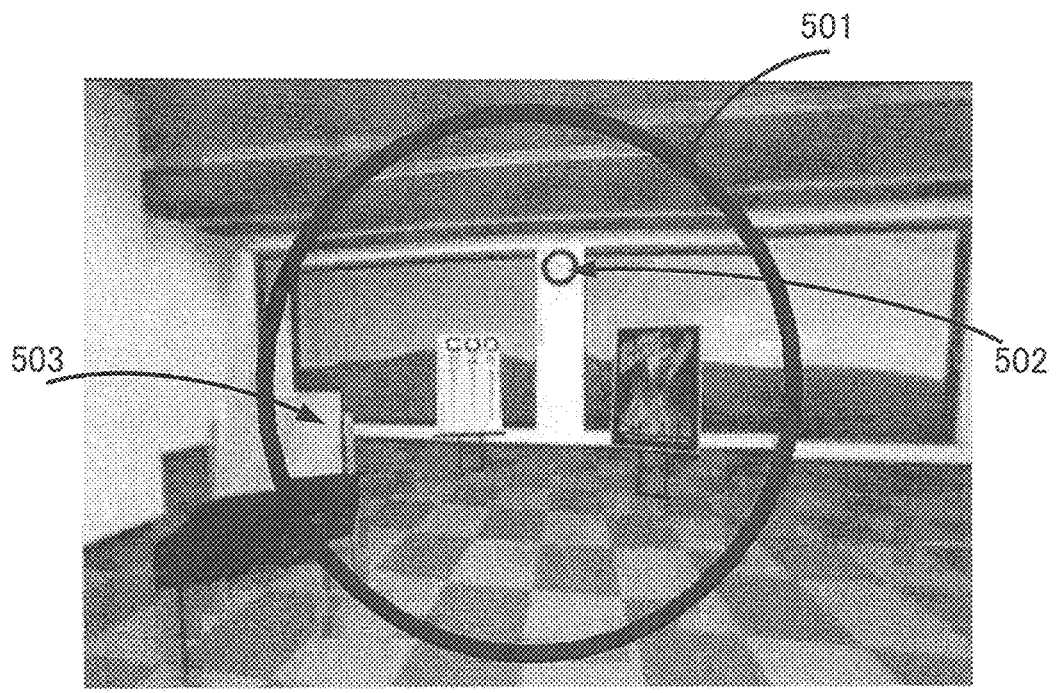
FIG. 5 shows the usage of concave lens (501) to correct for myopia (inability to focus on far objects). Both far object (502) and near object (503) can be focused.
Figure 6:
FIG. 6 shows the usage of convex lens (601) to correct for the near distances in presbyopia. The near object (603) can be focused, but the far object (602) cannot be focused.
Figure 7:
FIG. 7 shows that more sophisticated optics were introduced by the bifocal lens, whereby the upper half of the lens is constructed to assist viewers for far distance view (702), while the lower half of the lens is constructed to assist viewers for near distance view (703). This enables a user with presbyopia to view both near and far with a single pair of glasses.
Figure 8:
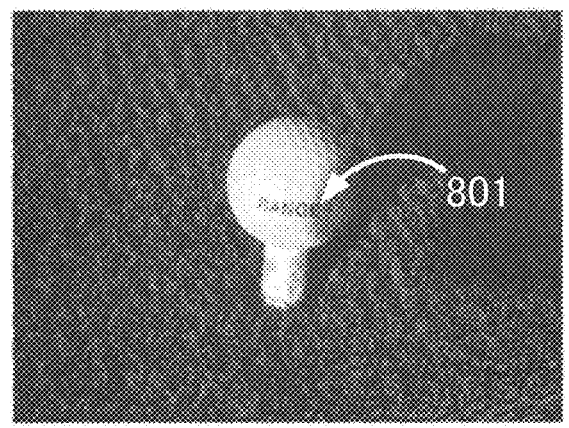
FIG. 8 shows that a bifocal lens enables a user to read a scorecard, but prohibits the viewer from focusing on a golf ball (801) when taking a shot.

Conditions exist whereby visual acuity (1/(gap size [arc min]) is deficient for objects with a near focal length (defined here as the distance between the object and the viewer less than 1 m) and far focal length (defined here as the distance between the object and the viewer more than 1 m). The area outside the circle in FIG. 5 illustrates deficient visual acuity at far focal length, corrected with a concave lens (area inside circle). The area outside the circle in FIG. 6 illustrates deficient visual acuity at near focal length, corrected with a convex lens (area inside circle). Conceptually, the apparatus shall enable the viewer with deficiency of visual acuity to perceive near objects in a manner similar to the area inside the circle in FIG. 6, while a viewer with deficiency of visual acuity to perceive far objects in a manner similar to the area inside the circle in FIG. 5.

Given a deficiency in visual acuity that is dependent on distance from viewer to object, the apparatus employ an algorithm that varies (1) the focal length of the camera depending on the distance from viewer to the object, (2) the magnification of the object in question, and (3) the contrast of the emitted display image, to maximize visual acuity.

We claim:

1. A display system comprising:
   a microdisplay device having a color light source;
   a control system to drive and control said microdisplay device and said color light source;
   optical elements disposed on an optical path of a light projected from the color light source to direct the light to a see-through lens disposed along a visual field of a user;
   an image sensor module for capturing video images in front of the see-through lens at different distances from the see-through lens; and
   a video processing unit to modulate and process the video images for reconstructing images of objects at multiple focal distances along the visual field of the user and displaying an image with the objects at an user perceivable and differentiable focal distance to improve a viewing experience of the user.

2. The display system of claim 1 wherein:
   the video sensor module further includes a camera lens.

3. The display system of claim 1 wherein:
   the video processing unit further modulates and process the video images to reconstruct the images of the objects with color adjustments such that the user can differentiate objects with wavelengths 564-580 nm, 534-545 nm, and 420-440 nm, by more than 1%.

4. The display system of claim 1 wherein:
   the video processing unit further modulates and process the video images to reconstruct the images of the objects with an expanded horizontal and vertical visual field arc length in front of the see-through lens.

5. The display system of claim 1 wherein:
   the video processing unit further modulates and process the video images to reconstruct the images of the objects with increased differences in brightness between discrete areas in the visual field.

6. The display system of claim 5 wherein:
   the video processing unit further modulates and process the video images to reconstruct the images of the objects with the increased differences in brightness between discrete areas in the visual field wherein the discrete areas of differences in brightness are defined as $K=(Lh-Ll)/Lh$ whereby $0=<K=<1$, $K=0$ means there is no contrast while $Kmax=1$, $Lh$ is the brightness at a discrete area with high luminescence, and $Ll$ is the brightness at a discrete area with low luminescence.

7. The display system of claim 1 wherein:
   the video processing unit further modulates and process the video images to reconstruct the images of the objects by inverting the brightness of light and dark areas of the visual field.

8. The display system of claim 1 further comprising:
   an eyeglass frame to support the display system.

9. The display system of claim 1 further comprising:
   an eyeglass frame to support the display system and the see-through lens as an eyeglass lens.

10. The display system of claim 1 wherein:
    the video processing unit further modulates a color content of the video images to reconstruct the images of the objects by adjusting a pulse width for projecting a color from the color source.

11. The display system of claim 1 wherein:
    the video processing unit and the control system further reconstructs the images of the objects by increasing a color differentiation of the video images by selectively increasing a brightness of at least one color of said color light source.

12. The display system of claim 1 wherein:
    the image sensor module further comprising an auto-focus controller for capturing video images in front of the see-through lens.

13. The display system of claim 1 wherein:
    the image sensor module further includes an infrared light sensor and said video processing unit further processes and modulates the video images captured by the image sensor module including the infrared light sensor.

14. The display system of claim 1 wherein:
    the video processing unit further controls the image sensor module for capturing images of individually focused objects with adjusted brightness for reconstructing the image of the objects including the individually focused objects.

15. The display system of claim 1 further comprising:
    an audio input/output device.

16. The display system of claim 1 further comprising:
    a battery to supply power to the display system.

17. The display system of claim 1 wherein:
    the video processing unit comprises a plurality of components wherein the components communicate with a wired and wireless communication signals.

18. The display system of claim 1 wherein:
    the video processing unit comprises a plurality of components wherein at least one of the components is an external component implemented on a cellular phone and communicates with the video processing unit by wireless signals.

19. The display system of claim 1 wherein:
    the see-through lens comprises a transparent plate constituting a waveguide having a hologram layer.

20. The display system of claim 1 wherein:
    the image sensing module further comprises a CMOS sensing module.

* * * * *